April 26, 1932. C. R. WOODWARD, JR 1,856,011
INTERNAL COMBUSTION ENGINE
Filed Nov. 28, 1930  3 Sheets-Sheet 1
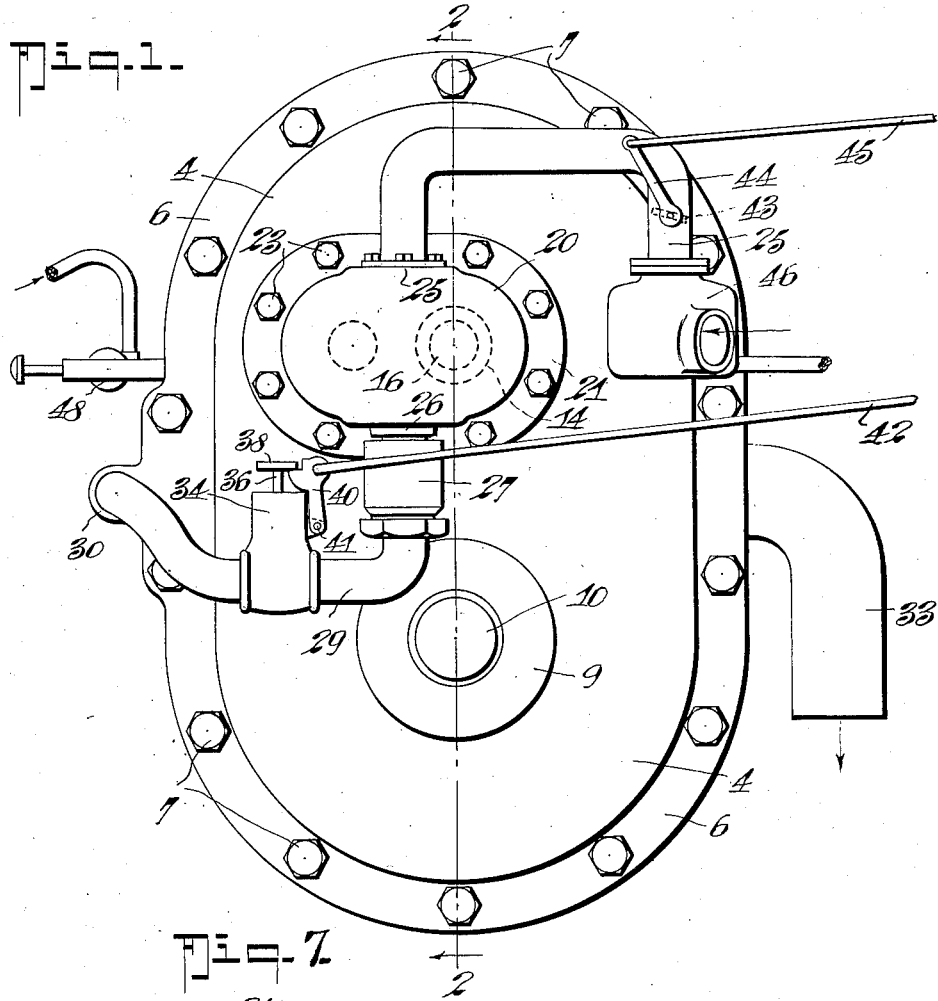
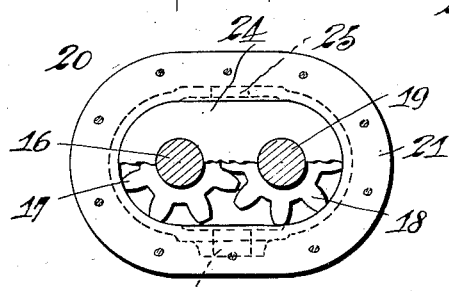
Inventor
Charles R. Woodward, Jr.
By Albert E. Dieterich
Attorney April 26, 1932.   C. R. WOODWARD, JR   1,856,011
INTERNAL COMBUSTION ENGINE
Filed Nov. 28, 1930   3 Sheets-Sheet 2
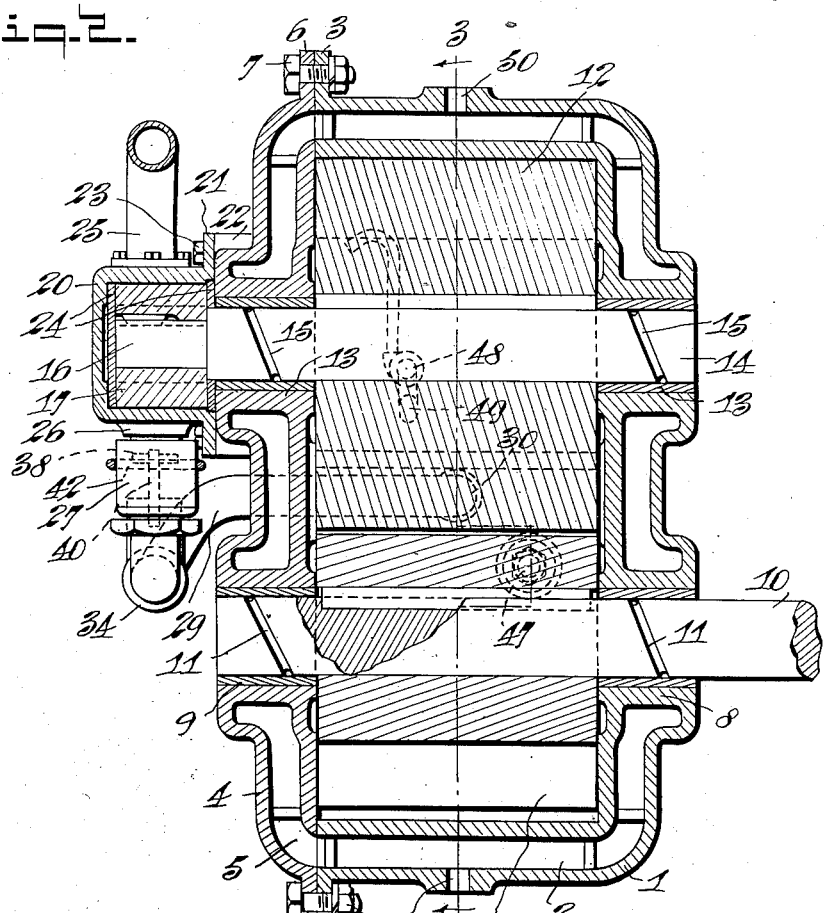
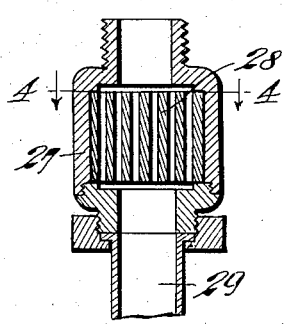
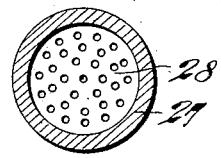
Inventor
Charles R. Woodward, Jr.
By Albert E Dietrich
Attorney

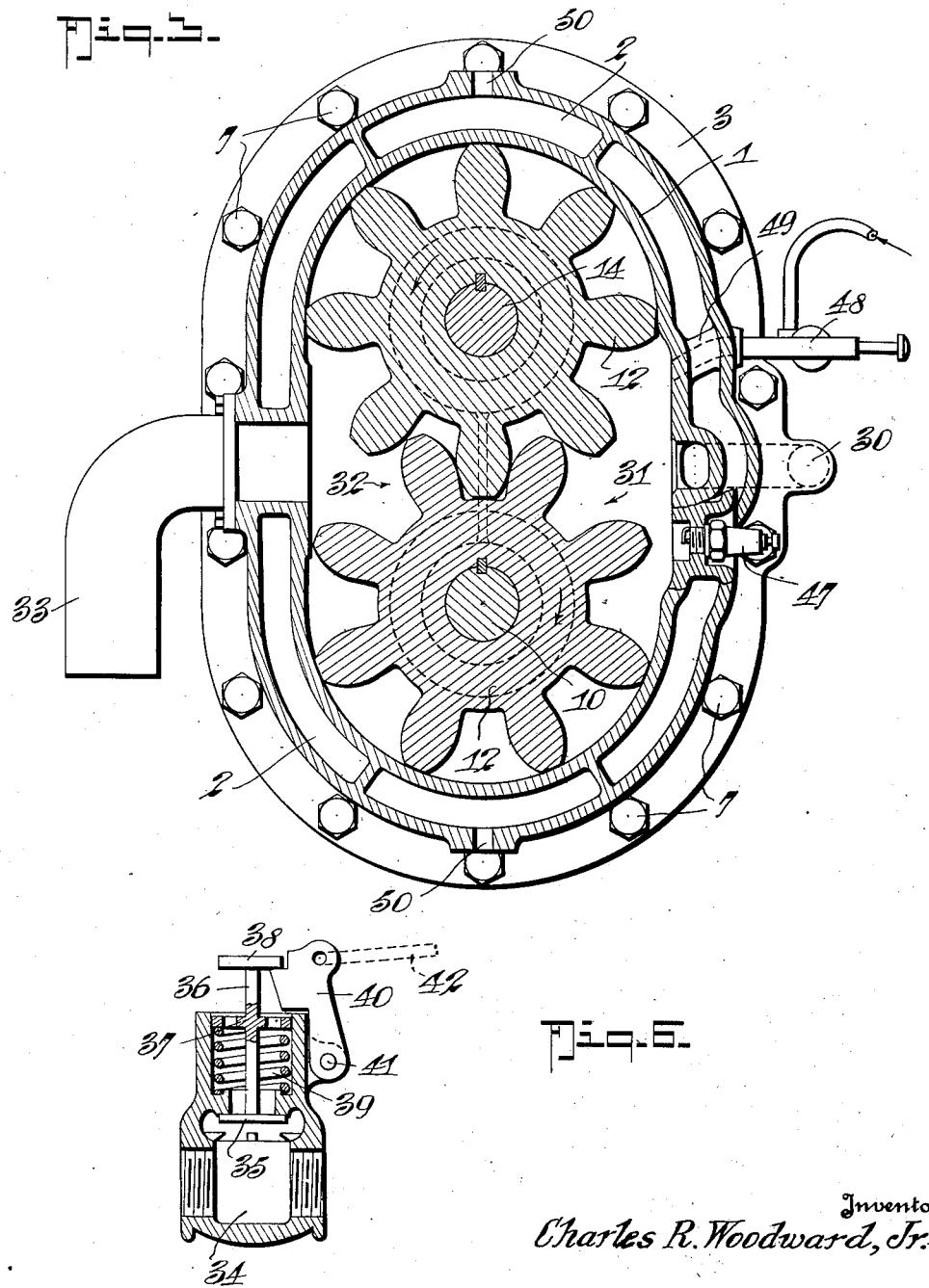

Patented Apr. 26, 1932

1,856,011

UNITED STATES PATENT OFFICE

CHARLES ROBERT WOODWARD, JR., OF ELMIRA, NEW YORK

INTERNAL COMBUSTION ENGINE

Application filed November 28, 1930. Serial No. 498,823.

My invention relates to the art of internal combustion engines and it particularly has for an object to provide an engine of the inter-geared rotating piston kind which will operate effectively without the use of the usual inlet and exhaust valves.

Further, it is an object to provide an engine having inter-geared rotors or gear pistons whose working chamber is, during the operation of the engine, supplied with a continuous flow of fuel for combustion therein to produce a continuous steady application of power.

The invention has for an object to provide an efficient engine of low manufacturing cost, few moving parts, light yet rugged in constuction, and one by the use of which, in motor vehicles, the advantages of the so-called free wheeling may be obtained.

Further objects are to provide an engine in which there is no piston rapidly rising and falling against its own inertia and no reciprocating connecting rod with its large bearings to resist centrifugal force and inertia, and in which there are no periodic explosion forces; an engine in which the familiar poppet or rotary valves of present day tyes are eliminated; an engine which eliminates exactly timed ignition; an engine which may be started without the use of a starting motor; an engine in which there are only three moving units; and an engine which is practically free from the vibrations now so common in reciprocating piston types.

Other objects will in part be obvious and in part be pointed out hereinafter.

To the attainment of the aforesaid objects and ends, the invention still further resides in the novel details of construction, combination and arrangement of parts all of which will be first fully described in the following detailed description, then be particularly pointed out in the appended claims, reference being had to the accompanying drawings, in which:—

Figure 1 is a front elevation of my engine.

Figure 2 is a vertical cross section on the line 2—2 of Figure 1.

Figure 3 is a longitudinal section on the line 3—3 of Figure 2.

Figure 4 is a detail horizontal section of the flame baffle.

Figure 5 is a detail vertical section of the flame baffle.

Figure 6 is a detail vertical longitudinal section of the relief valve.

Figure 7 is a detail inner face view of the pump, one-half of the inner wear plate 24 being removed.

In the drawings, in which like numerals of reference designate like parts in all of the figures, 1 represents the engine casing which is provided with a suitable water jacket 2 for cooling and which is also provided with a front flange 3 to which the removable cover 4 is bolted as at 7, the cover having a flange 6 to cooperate with the flange 3, the cover being also water-jacketed as at 5. The jacket space of the cover and that of the body portion of the casing 1 are in communication and water is supplied to and removed from the jacket through water connections 50 that may be coupled with a suitable radiator (not shown). Since the means of effecting circulation of water through the water jacket can be any means now in common use in internal combustion engines, further description thereof in this specification and illustration thereof in the drawings are thought to be unnecessary.

A power shaft 10 is journalled in suitable bearings 8 and 9 in the casing and its cover and this shaft 10 is provided with suitable oil grooves 11 which insure proper lubrication of the bearing surfaces and also assist in preventing leakage in explosive mixture through the bearings.

There are provided within the casing 1 two inter-geared rotors or gear pistons as I shall hereinafter term them, designated by the numeral 12, one being mounted on and keyed to the shaft 10, while the other is mounted on and keyed to the shaft 14, the shaft 14 being mounted in suitable bearings 13 in the casing 1 and its cover 4. Oil grooves 15 are provided similar to and for the same purpose as the grooves 11.

The shaft 14 extends through the cover 4 and has a reduced extension 16 on which is mounted one, 17, of the inter-geared pistons 17 and 18 of the fuel charging pump 20, the piston 18 being secured on the short shaft 19 which is journalled in suitable bearings in the casing of the pump 20. The pump casing has a flange 21 which fits against the face 22 of the cover 4 and is secured to it by cap screws 23, suitable wear and gas-sealing plates 24 being located at each side of the pistons 17, 18.

25 designates the mixture intake duct from the carburetor 46, there being a throttle valve 43 mounted in this duct and having its lever 44 controlled by a rod 45 which leads to a suitable place for actuation by the operator.

There is a transfer duct 29 provided for conveying the fuel from the pump 20 to the fuel intake 30 of the casing 1, the fuel intake delivering the charge into the combustion space 31 of the casing. In this duct 29 is located a flame baffle unit 27 having (preferably) a removable cartridge 28 consisting of a body with a large number of small apertures through it, and I prefer to locate the flame baffle unit 27 adjacent the outlet port 26 of the fuel pump.

32 designates the exhaust chamber of the casing from which the spent gases are passed through the exhaust pipe 33 to atmosphere.

In order to obtain the advantages of free wheeling I provide a vacuum relief valve unit 34 and locate the same in the duct 29. The vacuum relief valve unit 34 includes a relief valve 35 having a stem 36 carrying a guide 37 and a button head 38, there being a valve spring 39 interposed between the guide 37 and the valve seat web of the valve unit 34 which tends continuously to seat the valve 35.

40 is a valve locking dog which is pivoted at 41 to the casing of the valve unit 34 and is adapted to be brought into locking position or out of locking position by a suitable operating rod 42, the structure being such that when the lever 40 is moved to engage the under side of the button head 38 the valve 35 will be locked against opening and thus at times permit the establishment of a partial vacuum within the duct 29 for the purpose presently explained.

The casing 1 is provided with a suitably threaded opening to receive the usual spark plug 47. It is also provided with an opening to receive a primer 48, the opening including the duct 49 for delivering a priming charge from the primer 48 into the working chamber 31. The primer may be of any approved construction adapted for injecting an initial charge of gasoline into the combustion chamber 31 for ignition by the spark to start the engine.

In operation, a priming charge of gasoline is injected into the combustion chamber 31 by means of the primer 48 as hereinbefore intimated and the ignition circuit (not shown but of the usual construction) is closed to create a spark at the plug 47. This causes ignition of the gasoline and air within the chamber 31 and starts the gear-pistons 12—12 to turn in the direction of the arrows in Figure 3. The turning of these pistons causes the fuel pump pistons 17 and 18 to draw fuel from the carburetor 46 and deliver it into the combustion chamber 31 via the ducts 29 and 30 where it is ignited by the burning fuel within the chamber 31. The spent gases pass out from the exhaust chamber 32 through the exhaust pipe 33 to atmosphere. This operation continues so long as the throttle valve 43 is open, and of course the speed of the engine depends upon the position of the throttle valve.

Should the power shaft 10 be coupled to a drive shaft of an automobile for instance and the speed of the driving shaft exceeds that at which the shaft 10 is being driven under power (as in coasting) the vacuum relief valve 35 will open and free wheeling will thus take place. However, if the engine is to be used as a brake, the valve 35 is locked by the latch dog 40, and then the over-running of the motor gear-pistons 12 by the power applied to the shaft 10 through momentum of the vehicle will result in the formation of a partial vacuum in the chamber 31 and duct 30 which will retard the motion of the gear-pistons 12 and consequently cause the vehicle to be restrained.

From the foregoing it will be seen that my engine is characterized by the following:

An absolutely steady flow of power, a constant flow of power which is at once the cause and result of its simplified and rational design; this is achieved without expensive and intricate machine parts.

The fuel is forced in a steady flow into the combustion chamber where it is exploded or burned creating a pressure which the rotor-teeth (gear-pistons) convert into a steady rotary motion. The engine is neither a two nor a four cycle engine. There is simply an explosion and continuous combustion and expansion, the exhaust gases being ejected. This expansion is confined and under full control so that its energy is absorbed and utilized by the revolving gear-pistons. A study of the combustion chamber shows that, in effect, the rotor teeth "spread", accommodating the expansion and converting it into usable rotatable motion as transmitted to the drive gear shaft and in turn to such units as the clutch, transmission and rear wheels as arranged on an automobile of conventional, present day construction.

The rotary gear-type fuel pump draws the combustible mixture from the carburetor and injects it against the explosion pressure into the explosion chamber where there is already flame (assuming the engine has been started). This fuel of necessity ignites, burns and expands. This process constitutes the operation of the engine.

Ignition by a conventional spark plug is necessary for starting only. When the machine is in operation, the spark may be switched off, and the engine will continue to revolve and render full power without any exterior ignition aid. This is also an advantage of its simple construction, it being automatic at all points.

Control is achieved in exactly the same manner as on a vast number of internal combustion engines used on motor cars today, namely by a butterfly valve in the carburetor throat, which throttles or releases the flow of fuel at the will of the operator.

Cooling is achieved by circulating water in jackets adjacent the heat areas. The bearings especially are adapted to this method, as they can be entirely surrounded by water passages.

The rotor teeth can be made of friction-resiting metal, or they may be lubricated by employing crude gasoline, which will leave a small amount of oil on the teeth during the combustion process.

Clearance space at the periphery of the motor rotor teeth is slight (about $\frac{1}{32}$ of an inch in an engine employing rotors of about 12 inches in diameter) said space being sealed by the normal formaton of carbon resulting from the ignition of fuel.

Bearings are designed for torque loads only. They are free from inertia forces, centrifugal forces and periodic explosion forces. They are especially free of fatigue-inducing faults inherent in other types.

Starting the engine is achieved by doing two things: (a) Turning on the ignition which consists of the usual spark induction coil with vibrator, the secondary of which is connected to the spark plug and grounded to the engine frame while the primary of which includes a battery and a switch for opening and closing the primary circuit, all of which ignition system is well known and, per se, forms no part of my present invention, (b) priming the combustion chamber. The priming fuel ignites and as the rotors revolve the fuel pump sends its supply to the combustion chamber, and the power-process is in operation.

The vital points of difference between other engines and my present engine are as follows:

(a) There are no reciprocating parts whatever in my engine.

(b) There are only three moving units in the motor proper.

(c) There are no valves, either positive or automatic, save only the relief valve which is necessary only when a free wheeling motor is desired.

(d) The power action of the burned mixture results in a steady even flow in the engine and not in a series of periodic explosions as in other engines.

(e) Other engines require an intake (of fuel), a compression, an expansion and an exhaust process, all separate and requiring a special mechanism. My engine has only an intake, explosion and exhaust, all continuous nonpulsating, and substantially simultaneous, and all enacted in an integral, efficient mechanism.

(f) In my engine provision is made within the engine itself for the condition known as "free wheeling". In free wheeling, the engine while in gear, reference being made to an automobile, can be over-run by the vehicle, as in coasting or gliding to a stop. This is accomplished by the vacuum relief valve located in the fuel line between the fuel pump and the combustion chamber. This relief, which is really a pneumatic check-valve, can be left to operate automatically, or can be locked manually. When locked in the closed position the rotary engine becomes a brake when the throttle is closed.

When the engine is spun by the momentum of the car with closed throttle, it is transformed from a motor to a pneumatic pump. The reason for this is that the volumetric capacity of the engine rotors far exceeds the like capacity of the pump rotors. A vacuum results. If the vacuum is permitted to continue, the engine becomes an effective automobile brake. If the vacuum is relieved, we have a free wheel condition in which the vehicle can over-run the engine in spite of the fact that the transmission is "in mesh". As stated elsewhere, the relief unit can be locked or unlocked manually, and whether or not, the power operation of the engine is not effected.

Great compression of the fuel charge is achieved before it ignites. This is due to the fact that the fuel pump works against the explosion in the chamber. This compression is recognized as a great advantage.

To keep the fuel pump cool as well as to insure safety, a flame baffle with small apertures is installed adjacent the pump between it and the explosion chamber. The burning gas beyond it is choked and cooled should it seek a backward path toward the pump.

The exhaust gases are ejected automatically and can be conducted to any point of disposition.

From the foregoing description, taken in connection with the accompanying drawings, it is thought the construction, operation and advantages of my invention will be clear. Changes in the details of construction, proportion and arrangement of parts may readily be made within the scope of the invention without departing from the same as defined by the appended claims.

What I claim is:

1. In rotary internal combustion engines, a casing, a pair of inter-geared rotating pistons located within said casing and dividing the same into a combustion space and an exhaust space, a power shaft mounted in suitable bearings in said casing and carrying one of said pistons, a second shaft mounted in bearings in said casing and carrying and turning with the other of said pistons, a fuel pump comprising a pump casing mounted on the engine casing and a pair of inter-geared rotating pump pistons located in said pump casing, one of said pump pistons being mounted on said second shaft and driven thereby, a third shaft journalled in bearings in said pump casing and carrying the other of said pump pistons, means to deliver a combustible mixture to said fuel pump, an open duct between said fuel pump and said combustion space, and a vacuum relief valve in communication with said open duct to effect communication with the atmosphere upon the creation of a negative pressure in said open duct.

2. In rotary internal combustion engines, a casing, a pair of inter-geared rotating pistons located within said casing and dividing the same into a combustion space and an exhaust space, a power shaft mounted in suitable bearings in said casing and carrying one of said pistons, a second shaft mounted in bearings in said casing and carrying, and turning with the other of said pistons, a fuel pump comprising a pump casing mounted on the engine casing and a pair of inter-geared rotating pump pistons located in said pump casing, one of said pump pistons being mounted on said second shaft and driven thereby, a third shaft journalled in bearings in said pump casing and carrying the other of said pump pistons, means to deliver a combustible mixture to said fuel pump, an open duct between said fuel pump and said combustion space, a flame baffle in said open duct, and a vacuum relief valve in communication with said open duct to effect communication with the atmosphere upon the creation of a negative pressure in said open duct.

3. In rotary internal combustion engines, a casing, a pair of inter-geared rotating pistons located within said casing and dividing the same into a combustion space and an exhaust space, a power shaft mounted in suitable bearings in said casing and carrying one of said pistons, a second shaft mounted in bearings in said casing and carrying and turning with the other of said pistons, a fuel pump comprising a pump casing mounted on the engine casing and a pair of inter-geared rotating pump pistons located in said pump casing, one of said pump pistons being mounted on said second shaft and driven thereby, a third shaft journalled in bearings in said pump casing and carrying the other of said pump pistons, means to deliver a combustible mixture to said fuel pump, an open duct between said fuel pump and said combustion space, and a vacuum relief valve in communication with said open duct to effect communication with the atmosphere upon the creation of a negative pressure in said open duct, and means to hold said vacuum relief valve closed at will.

4. In rotary internal combustion engines, a casing, a pair of inter-geared rotating pistons located within said casing and dividing the same into a combustion space and an exhaust space, a power shaft mounted in suitable bearings in said casing and carrying one of said pistons, a second shaft mounted in bearings in said casing and carrying and turning with the other of said pistons, a fuel pump comprising a pump casing mounted on the engine casing and a pair of inter-geared rotating pump pistons located in said pump casing, one of said pump pistons being mounted on said second shaft and driven thereby, a third shaft journalled in bearings in said pump casing and carrying the other of said pump pistons, means to deliver a combustible mixture to said fuel pump, an open duct between said fuel pump and said combustion space, a flame baffle in said open duct, a vacuum relief valve in communication with said open duct to effect communication with the atmosphere upon the creation of a negative pressure in said open duct, and means to hold said vacuum relief valve closed at will.

5. In rotary internal combustion engines, a casing, a pair of inter-geared rotating pistons located within said casing and dividing the same into a combustion space and an exhaust space, a power shaft mounted in suitable bearings in said casing and carrying one of said pistons, a second shaft mounted in bearings in said casing and carrying and turning with the other of said pistons, a fuel pump comprising a pump casing mounted on the engine casing and a pair of inter-geared rotating pump pistons located in said pump casing, one of said pump pistons being mounted on said second shaft and driven thereby, a third shaft journalled in bearings in said pump casing and carrying the other of said pump pistons, means to deliver a combustible mixture to said fuel pump, a duct between said fuel pump and said combustion space, and a relief valve in said duct for effecting communication between said combustion space and the atmosphere upon creation of a negative pressure in said combustion space.

6. In rotary internal combustion engines, a casing, a pair of inter-geared rotating pistons located within said casing and dividing the same into a combustion space and an exhaust space, a power shaft mounted in suitable bearings in said casing and carrying one of said pistons, a second shaft mounted in bearings in said casing and carrying and turning with the other of said pistons, means for delivering a continuous flow of combustible mixture into the combustion space of said casing, means to ignite said mixture within the combustion space, means to deliver the exhaust gases from said exhaust space, a relief valve for effecting communication between said combustion space and the atmosphere upon creation of a negative pressure in said combustion space, and means to render said relief valve inoperative.

7. In rotary internal combustion engines, a casing, a pair of inter-geared rotating pistons located within said casing and dividing the same into a combustion space and an exhaust space, a power shaft mounted in suitable bearings in said casing and carrying one of said pistons, a second shaft mounted in bearings in said casing and carrying and turning with the other of said pistons, a fuel pump comprising a pump casing mounted on the engine casing and a pair of inter-geared rotating pump pistons located in said pump casing, one of said pump pistons being mounted on said second shaft and driven thereby, a third shaft journalled in bearings in said pump casing and carrying the other of said pump pistons, means to deliver a combustible mixture to said fuel pump, a duct between said fuel pump and said combustion space, and a relief valve in said duct for effecting communication between said combustion space and the atmosphere upon creation of a negative pressure in said combustion space, and means to render said relief valve inoperative.

8. In rotary internal combustion engines, a casing having a removable cover, a pair of meshing gear-pistons rotatably mounted within said casing and dividing the same into a combustion chamber and an exhaust chamber, said casing having shaft bearings, a power shaft mounted in certain of said shaft bearings, one of said gear-pistons being mounted on and turning with said power shaft, a second shaft mounted in the others of said bearings and carrying and turning with the other gear-piston, said second shaft projecting through the cover of said casing, a fuel pump casing mounted on the cover of said first mentioned casing and over the projecting end of said second shaft, a pair of meshing gear-pistons in said pump casing, one of which is mounted on the projecting end of said second shaft, a third shaft for the other of said pump gear-pistons, means for delivering a combustible mixture to said pump, a duct from said pump to the combustion space of said first mentioned casing for effecting a continuous communication between said pump and said combustion space, ignition means for the combustible within said combustion space, and means for injecting a priming charge into the combustion space for starting purposes.

9. In rotary internal combustion engines, a casing having a removable cover, a pair of meshing gear-pistons rotatably mounted within said casing and dividing the same into a combustion chamber and an exhaust chamber, said casing having shaft bearings, a power shaft mounted in certain of said shaft bearings, one of said gear-pistons being mounted on and turning with said power shaft, a second shaft mounted in the others of said bearings and carrying and turning with the other gear-piston, said second shaft projecting through the cover of said casing, a fuel pump casing mounted on the cover of said first mentioned casing and over the projecting end of said second shaft, a pair of meshing gear-pistons in said pump casing, one of which is mounted on the projecting end of said second shaft, a third shaft for the other of said pump gear-pistons, means for delivering a combustible mixture to said pump, a duct from said pump to the combustion space of said first mentioned casing for effecting a continuous communication between said pump and said combustion space, ignition means for the combustible within said combustion space, means for injecting a priming charge into the combustion space for starting purposes, and a vacuum relief valve for effecting communication between said combustion space and the atmosphere upon the creation of a negative pressure in said combustion space for the purposes specified.

10. In rotary internal combustion engines, a casing having a removable cover, a pair of meshing gear-pistons rotatably mounted within said casing and dividing the same into a combustion chamber and an exhaust chamber, said casing having shaft bearings, a power shaft mounted in certain of said shaft bearings, one of said gear-pistons being mounted on and turning with said power shaft, a second shaft mounted in the others of said bearings and carrying and turning with the other gear-piston, said second shaft projecting through the cover of said casing, a fuel pump casing mounted on the cover of said first mentioned casing and over the projecting end of said second shaft, a pair of meshing gear-pistons in said pump casing, one of which is mounted on the projecting end of said second shaft, a third shaft for the other of said pump gear-pistons, means for delivering a combustible mixture to said pump, a duct from said pump to the combustion space of said first mentioned casing for effecting a continuous communication between said pump and said combustion space, ignition means for the combustible within said combustion space, means for injecting a priming charge into the combustion space for starting purposes, and a vacuum relief valve for effecting communication between said combustion space and the atmosphere upon the creation of a negative pressure in said combustion space, and manually actuated means for locking said relief valve against operation at will.

CHARLES ROBERT WOODWARD, Jr.